(12) United States Patent
Rydzewski

(10) Patent No.: US 6,829,541 B2
(45) Date of Patent: Dec. 7, 2004

(54) MULTI-FIXTURE PNEUMATIC PRESS

(75) Inventor: Rafal Rydzewski, Elmwood Park, NJ (US)

(73) Assignee: Autocraft Industries, Inc., Oklahoma City, OK (US)

(*) Notice: Subject to any disclaimer, the term of this patent is extended or adjusted under 35 U.S.C. 154(b) by 58 days.

(21) Appl. No.: 10/400,218

(22) Filed: Mar. 27, 2003

(65) Prior Publication Data

US 2004/0204889 A1 Oct. 14, 2004

(51) Int. Cl.$^7$ .............. G01B 3/00; G01B 5/00
(52) U.S. Cl. ............................................. 702/33
(58) Field of Search .................... 702/33, 34, 35, 702/108, 114, 127, 170

(56) References Cited

U.S. PATENT DOCUMENTS

| | | | | |
|---|---|---|---|---|
| 4,676,090 A | * | 6/1987 | Nishimura et al. | 72/404 |
| 4,747,476 A | * | 5/1988 | East et al. | 192/107 M |
| 4,998,437 A | * | 3/1991 | Magoolaghan | 73/118.1 |
| 5,337,870 A | * | 8/1994 | Hays | 192/70.14 |
| 5,708,955 A | * | 1/1998 | Ungrue | 419/6 |
| 6,466,883 B1 | * | 10/2002 | Shim | 702/94 |
| 6,668,992 B2 | * | 12/2003 | Shimizu et al. | 192/18 A |
| 2004/0050645 A1 | * | 3/2004 | Martin | 192/105 C |

* cited by examiner

Primary Examiner—John Barlow
Assistant Examiner—Demetrius Pretlow
(74) Attorney, Agent, or Firm—David W. Carstens; Carstens & Cahoon, LLP (57) ABSTRACT

A method and apparatus for testing automobile transmission clutches are provided by the present invention. An operator assembles the clutch with the components on a fixture. The clutch has an internal spring assembly to be compressed and a circlip (retaining ring) to be installed to hold the spring under tension. The circlip is installed into a tool that is placed onto the clutch assembly and a press is used to push the circlip down over a cone in the installation tool, snapping the circlip closed in its final position. A different tool is then placed onto the clutch assembly that holds the clutch pack together. The press is again operated and the cylinder compresses the clutch pack. By applying air pressure to the clutch assembly through the fixture, the clutch pack is forced upwards to its closed position. The distance traveled by the clutch pack is visible on a linear gauge. This distance is the Clutch Clearance. If the clearance is out of range, the operator can remove the top reaction plate from the clutch pack and replace it with a thicker or thinner plate to achieve the correct tolerance.

8 Claims, 8 Drawing Sheets

MULTI-FIXTURE PNEUMATIC PRESS

BACKGROUND OF THE INVENTION

1. Technical Field

The present invention relates generally to automobile transmissions and more specifically to a method for assembling and testing for proper tolerances during assembly of the clutch.

2. Description of Related Art

An automatic transmission in an automobile utilizes a series of elements to control the smooth shifting from one gear to another. The clutch assembly is the main component that transfers hydraulic pressure to the rotational drive. Oil pressure is generated by an oil pump and directed by a valve body to the clutch.

The clutch comprises a set of steel plates, held by slots in a clutch drum, and a set of friction plates held in slots of a hub. The plates have clearance and can be rotated independently of each other. A piston sits in the base of the clutch. When a gear is required, oil is pumped under the piston, which compresses the plates and causes drive to be transferred through the compressed plates. The piston travel has to be a measured distance to ensure that the transfer of drive is correctly timed with the car's gearshift. The clutch pack must also have enough clearance so that no drive is transferred when the clutch is "off" and full drive is transferred when the clutch is "on".

Partial drag or slipping of the plate sets will result in burning and ultimately failure of the transmission. These two critical points are controlled by the correct selection of a reaction plate on top of the clutch pack. This plate is available in different thicknesses so that the clearance within the clutch can be adjusted to correct tolerances, depending on the needs of the vehicle and transmission.

Therefore, it would be desirable to have a method for determining the proper clearance specification and ideal reaction plate thickness within the clutch during assembly of the transmission.

SUMMARY OF THE INVENTION

The present invention provides a method and apparatus for testing automobile transmission clutches. An operator assembles the clutch with the components on a fixture. The clutch then requires an internal spring assembly to be compressed and a circlip (retaining ring) to be installed to hold the spring under tension. The circlip is installed into a tool that is placed onto the clutch assembly. A press is then operated to push the circlip down over a cone in the installation tool, snapping the circlip closed in its final position. The press is then released and the tool removed.

A different tool is then placed onto the clutch assembly. This is a ring that will hold the clutch pack (steel and friction plates) together. The press is again operated and the cylinder compresses the clutch pack. The operator then sets a linear gauge to zero. By applying air pressure (calibrated to suit clutch pack application, approximating operating oil pressure when in the vehicle) to the clutch assembly through the lower fixture, the clutch pack is forced upwards to its closed position. The distance traveled by the clutch pack is visible on the linear gauge. This distance is the Clutch Clearance, which is critical to the operation of the transmission. If the clearance is out of range, the operator can remove the top reaction plate from the clutch pack and replace it with a thicker or thinner plate to achieve the correct tolerance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
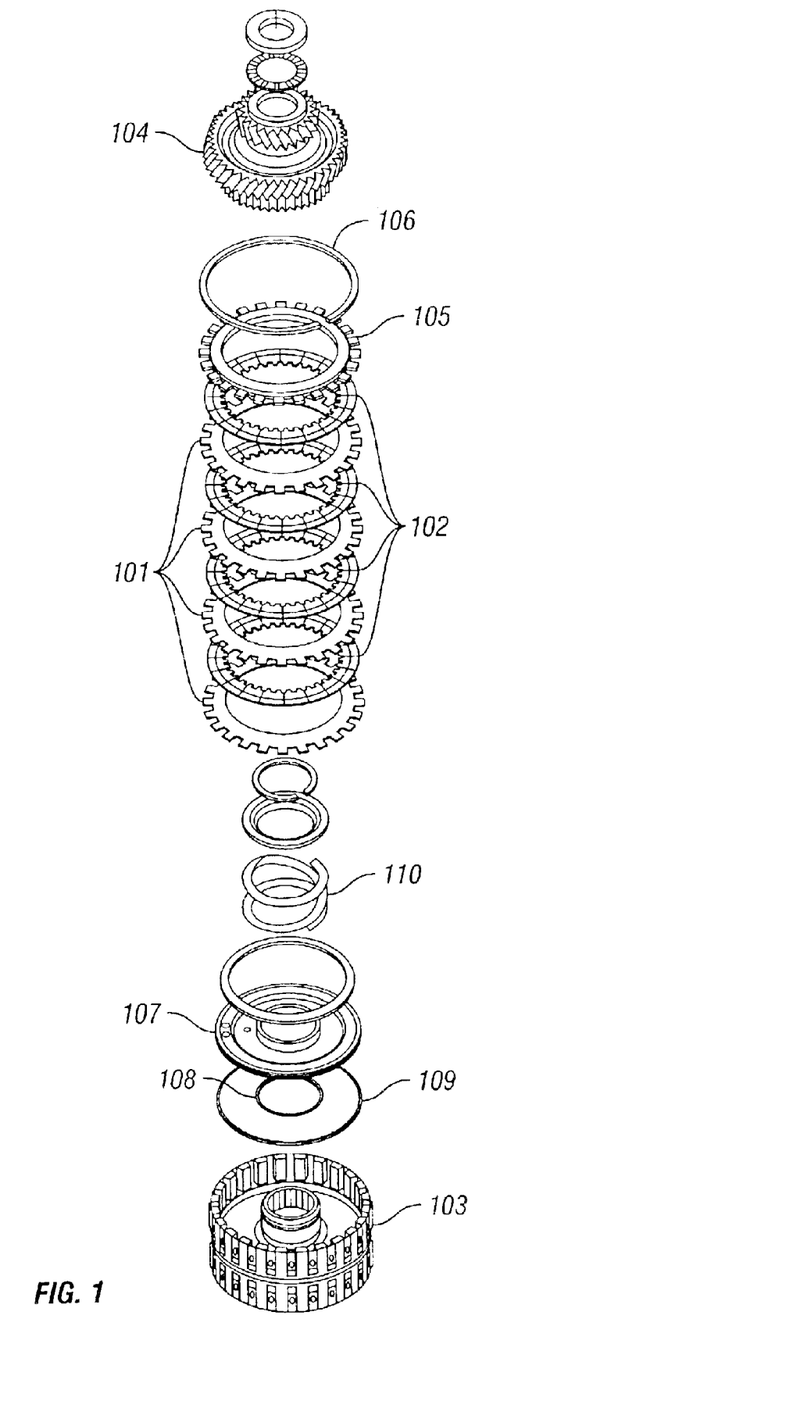
FIG. 1 depicts an exploded view schematic diagram illustrating an automatic transmission clutch pack in which the present invention may be implemented.

Referring to FIG. 1, an exploded view schematic diagram illustrates an automatic transmission clutch pack in which the present invention may be implemented. Automatic transmissions control the smooth shifting from one gear to another in an automobile, and the clutch assembly is the main component in an automatic transmission for transferring hydraulic pressure to rotational drive.

The clutch design comprises a set of steel plates 101 alternated with friction plates 102.

The plates 101 and 102 are packed into a clutch drum 103 and held in by a relating hub 104. The steel plates 101 have teeth around their outer edges, which are held by slots in the clutch drum 103. A reaction plate 105 is packed into the drum 103 on top of the steel plates 101 and friction plates 102 that have their teeth around their inner edges, which are held by slots in the hub 104 and held in place by a snap ring 106.

The plates 101 and 102 in the clutch pack have clearance and one set can rotate independently of the others. In the base of the clutch drum 103 sits a piston 107 and its seals 108 and 109, and is held down with a spring 110.

A center shaft (not pictured) drives the clutch drum 103 and is also the channel through which oil can be supplied to the under side of the piston 107. In normal operation with the clutch "OFF", the drum 103 will spin and no drive will be transferred to the hub. When the gear is required, the oil pressure from the pump is diverted through the shaft to the underside of the piston 107. The piston 107 will then move up against the spring 110 and compress the steel and friction plates 101 and 102 together against the reaction plate 105 and snap ring 106. Once full pressure is applied and the piston 107 is at the end of its travel, the clutch is "ON" and drive will be transferred through the compressed plates to the hub 104. When the gear is no longer required, the oil is vented from behind the piston 107 and the spring 110 forces the piston back, which releases the plates 101 and 102.

In order for the clutch to operate correctly, two measurements must be properly determined:
1. To ensure that the transfer of drive is correctly timed with the automobile's gearshift, the piston travel has to be a measured distance.
2. The clutch pack must have enough clearance so that no drive is transferred when the clutch is "OFF" and full drive is transferred when the clutch is "ON".

These two critical points are controlled by the correct thickness of the reaction plate 105, which can vary in size in order to meet required tolerances.

The present invention is a multi-function machine. It is used as an assembly tool/press and a gauging fixture. The invention comprises a holding fixture that enables the easy assembly of the piston and spring into the clutch drum and allows the installation of the clutch pack (plates) into the hub. The invention is then used to electronically indicate the size of the selective plate necessary to achieve the clearance specification. The invention also allows testing of the seals on the piston and overall clutch operation.

Figure 2:
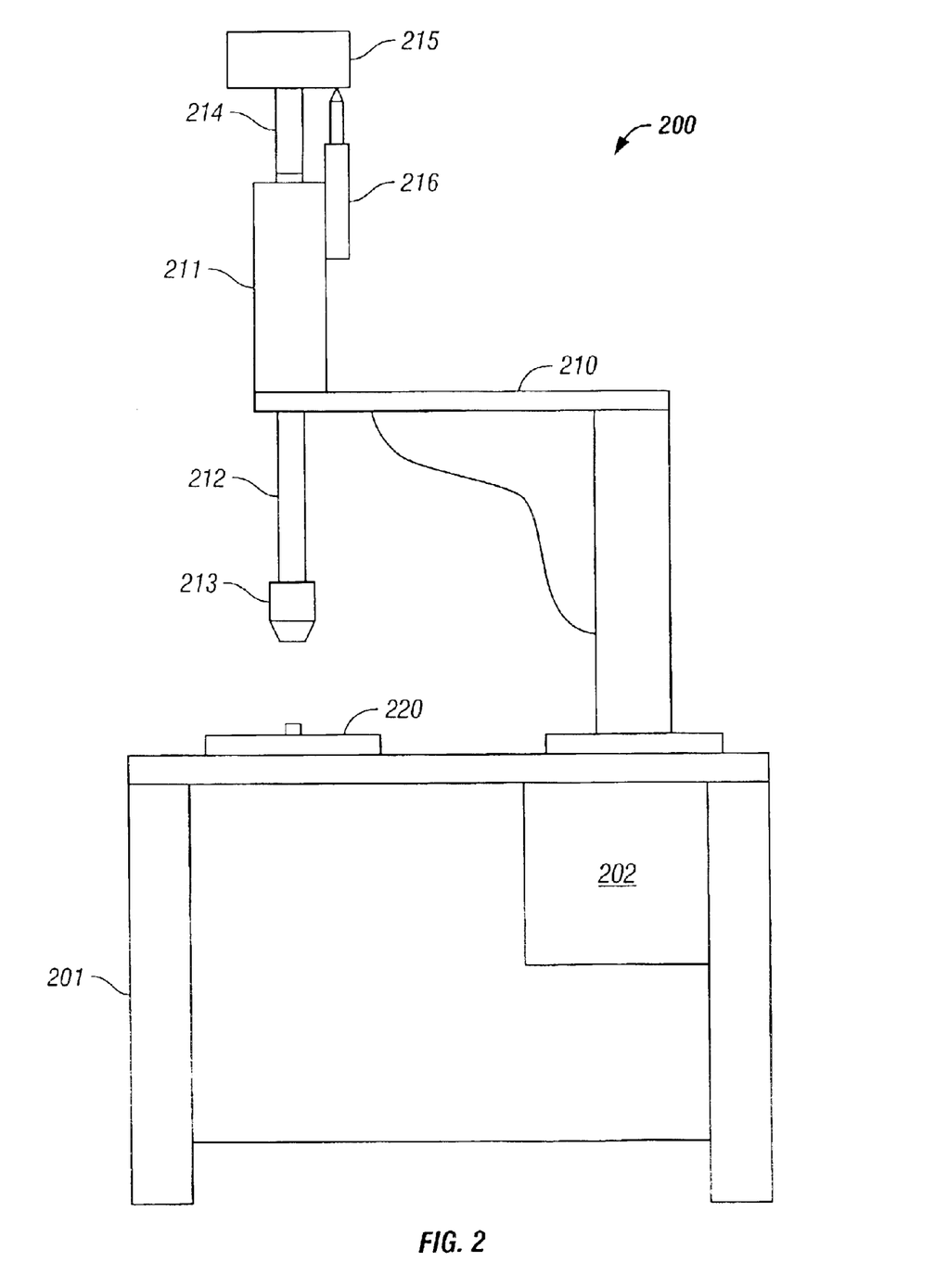
FIG. 2 depicts a schematic diagram illustrating the side view of a press with a clutch holding fixture in accordance with the present invention.

Referring now to FIG. 2, a schematic diagram illustrating the side view of a press with a clutch holding fixture is depicted in accordance with the present invention. The press 200 is mounted on a base 201 that puts the fixture and assembly tools at a good working height and houses a pneumatic control system 202. The rear support arm 210 is mounted on the base 201 and supports a cylinder 211. The arm 210 is required to be stiff enough to resist deflection created from the forces in the pressing operation of clutch assembly. The pneumatic cylinder 211 has a piston rod exiting both ends, one end 212 to a ram 213 and the other 214 to support a weight 215 and linear gauge 216.

The weight 215 shown mounted on the end of the cylinder 211 is used to oppose the air pressure under the piston during operation of the clutch. This simulates the loading of the clutch plates when the clutch is operated. There is no air pressure in the cylinder 211 when the clearance check is made (explained in detail below). The linear gauge 216 mounted on the cylinder 211 measures the vertical movement of the weight 215 when the clutch pack is raised by air pressure under the piston. A control box (not pictured) gives the option of controlling the air pressure. The control allows the pressure forcing the cylinder 211 down to be vented off so that only the weight 215 assembly is pressing down on the clutch pack when checking clearance.

The press 200 has adjustable weights, air pressures and quick-change fixtures for different clutches. In addition, for safety reasons, the press 200 may only be operated by means of a two-hand start controller.

Figure 3:
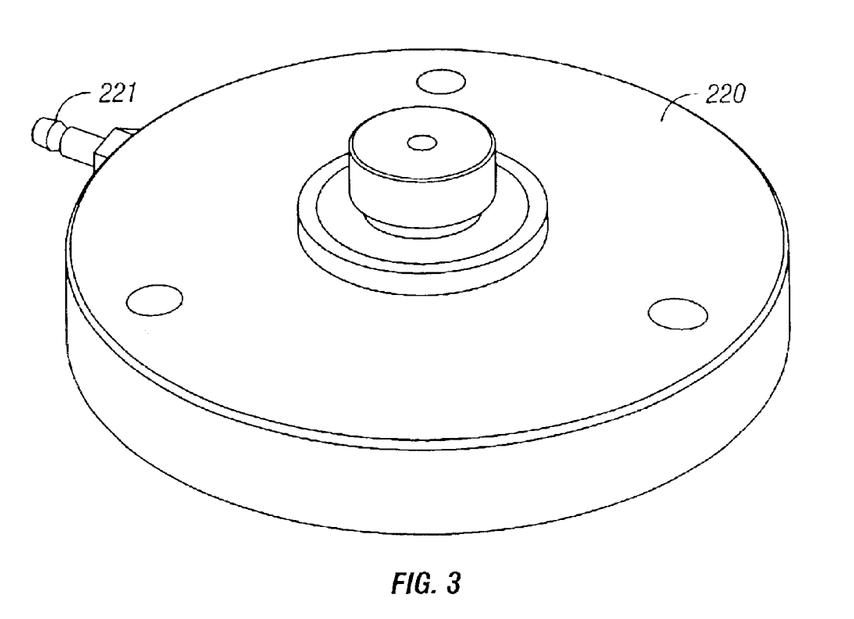
FIG. 3 depicts a perspective view diagram illustrating the base for the holding fixture in accordance with the present invention.

A fixture 220 is used to assemble the clutch and keep the clutch locked in place during operation of the press 200. A perspective view diagram illustrating the base 220 in more detail is depicted in FIG. 3. The fixture 220 is the base of the clutch assembly and check operation. A quick air connect 221 is incorporated into the base fixture 200 in order to apply air pressure to the clutch during clearance testing (described in detail below).

Figure 4:
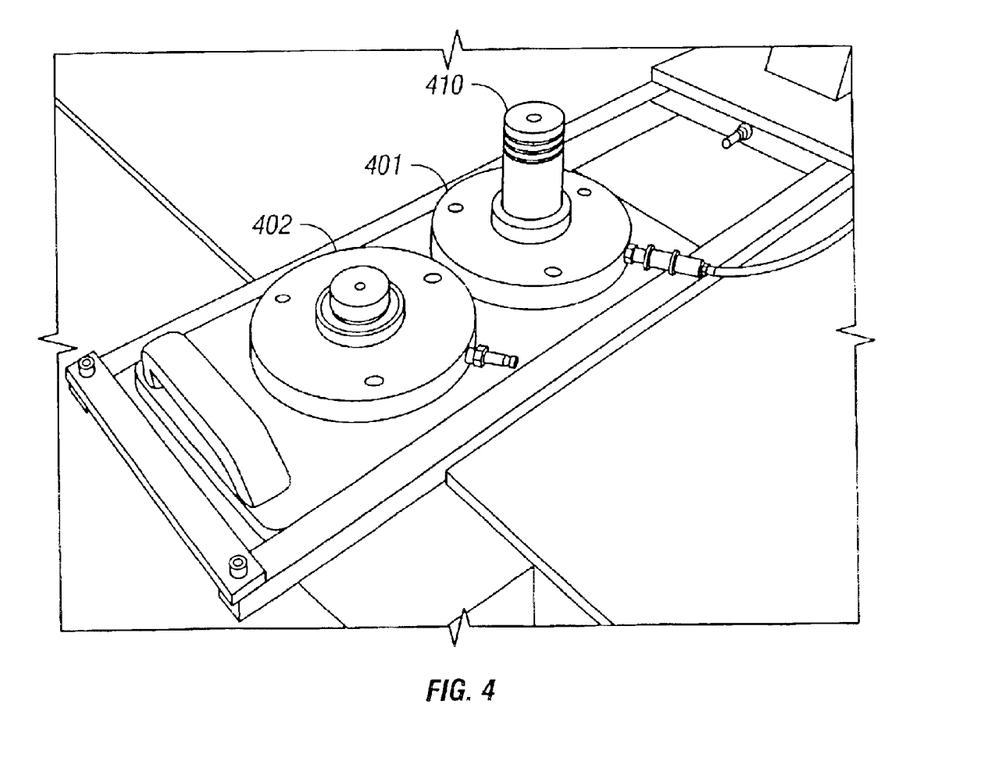
FIG. 4 depicts a perspective view diagram illustrating a sliding, dual-fixture set up in accordance with the present invention.

FIG. 4 depicts a perspective view diagram illustrating a sliding, dual-fixture set up. This set up incorporates two fixtures 401 and 402. The dual-fixture set up allows faster change over between fixtures/clutch assemblies by simply sliding one fixture (e.g. fixture 401) under the press ram, while simultaneously sliding the other fixture out of the way.

A center shaft 410 is depicted mounted on fixture 401. This shaft 410 is a dummy shaft identical in diameter to the clutch shaft in a transmission and supports the assembly during the building of the clutch pack and can also be used to apply pressure to the clutch for checking purposes (explained below).

Figure 5A:
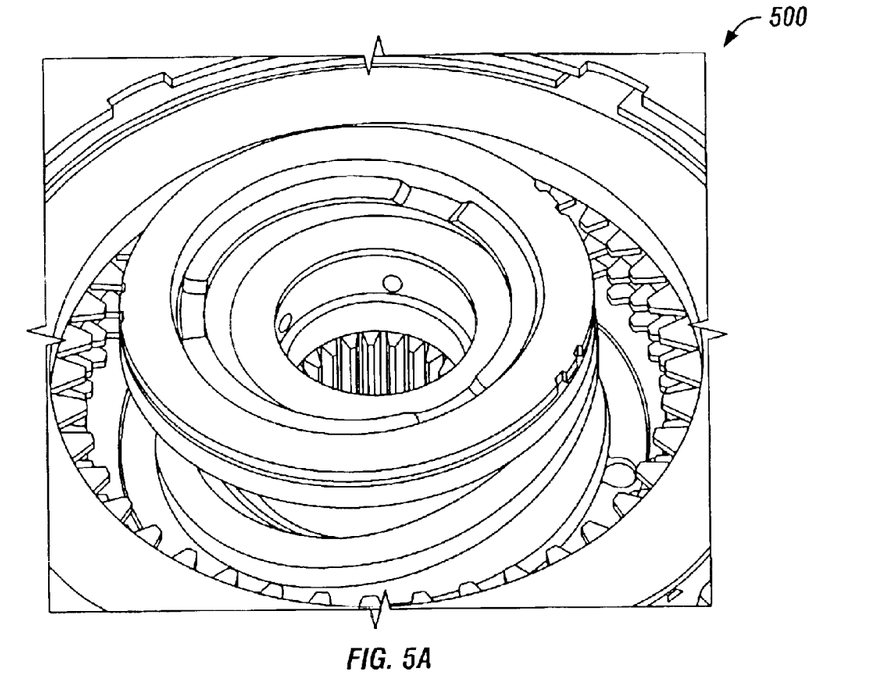
FIG. 5A depicts a diagram illustrating an assembled clutch pack in accordance with the present invention.

Referring to FIG. 5A, a diagram illustrating an assembled clutch pack is depicted in accordance with the present invention. The base fixture forms the support for the clutch drum assembly 500, and the components are assembled as depicted in FIG. 1. After the components of the clutch assembly 500 are in place, an installation tool is used in conjunction with the cylinder to press on a circlip (retaining ring).

Figure 5B:
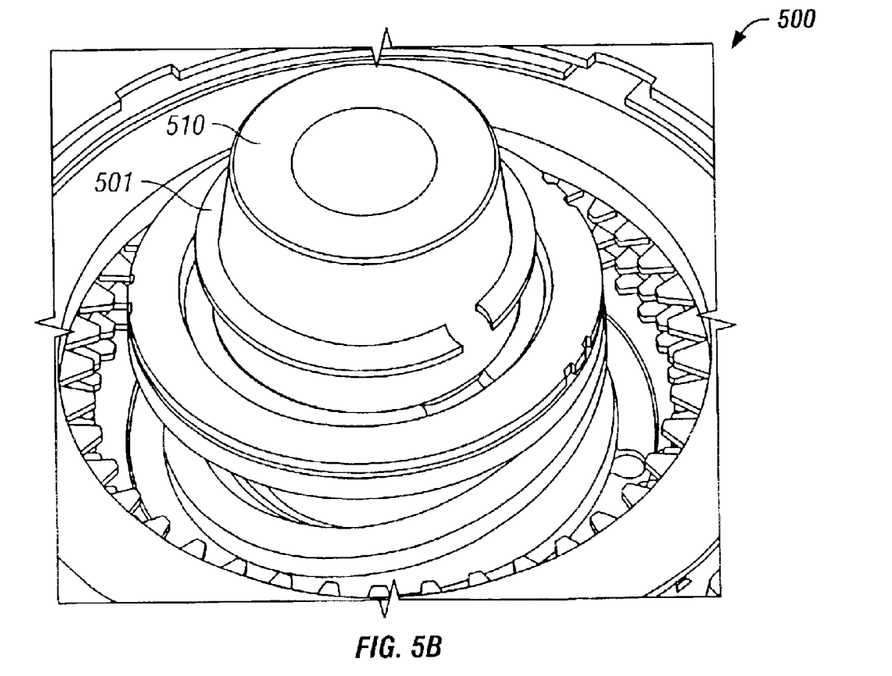
FIG. 5B depicts a diagram illustrating an assembled clutch pack with a retaining ring and the lower portion of an installation tool in accordance with the present invention.
Figure 5C:
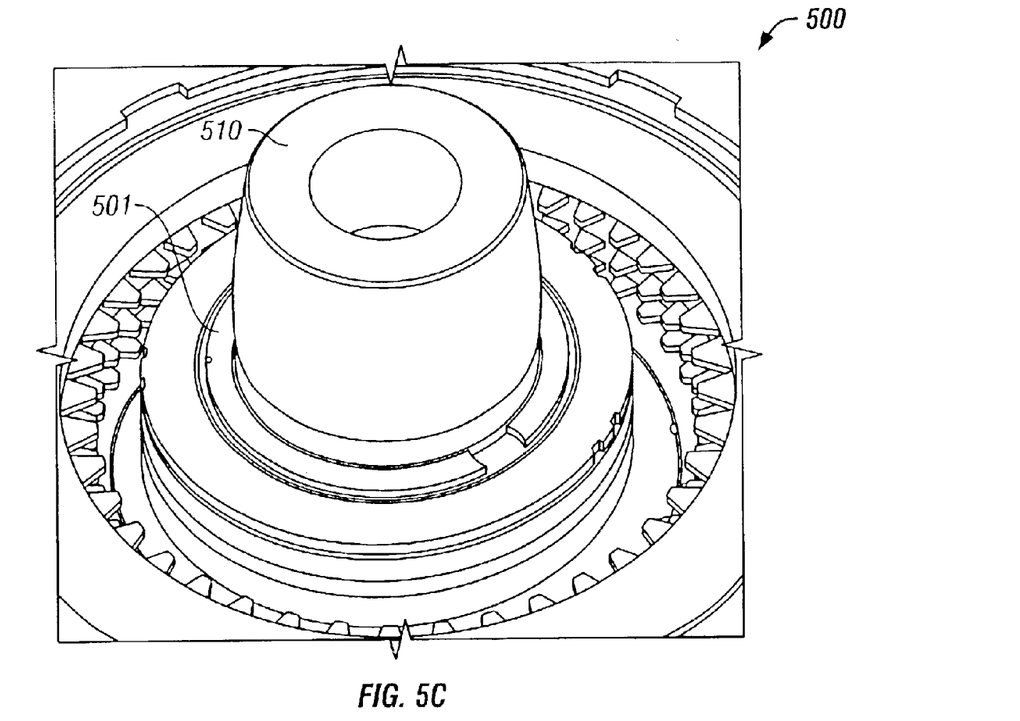
FIG. 5C depicts a diagram illustrating an assembled clutch pack with the retaining ring in its final secured position in accordance with the present invention.
Figure 5D:
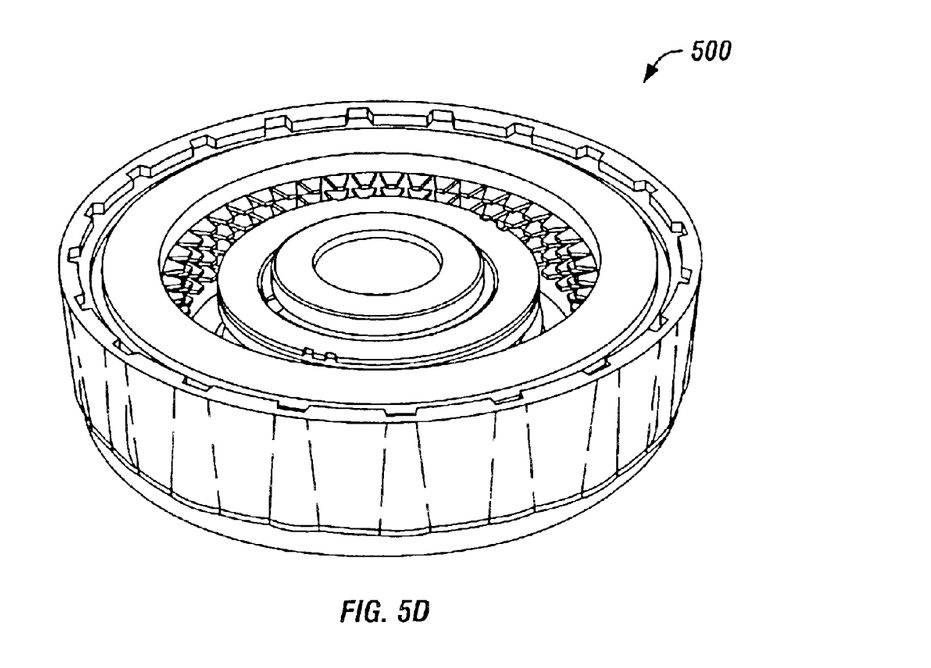
FIG. 5D depicts a diagram illustrating an assembled clutch pack with the retaining ring in its final secured position and the installation tool removed in accordance with the present invention.
Figure 6:
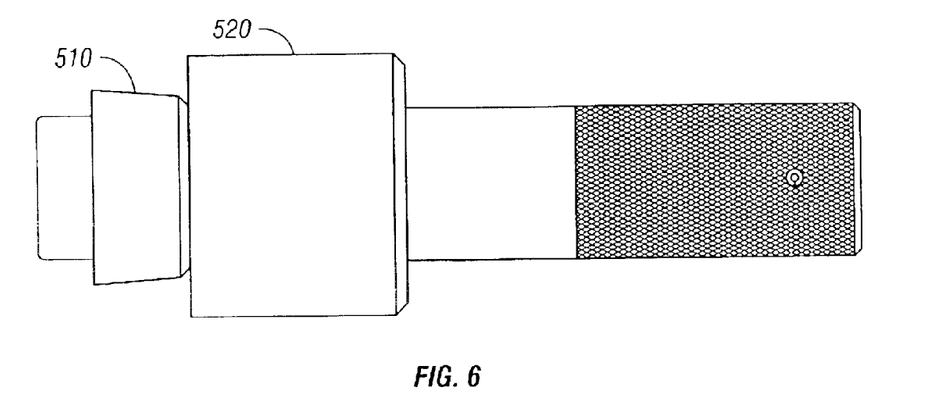
FIG. 6 depicts the complete retaining ring installation tool in accordance with the present invention.

FIG. 5B depicts the clutch assembly with the installation tool and circlip. For purposes of illustration, only the lower portion 510 of the installation tool is shown in FIGS. 5B and 5C below. FIG. 6 depicts the complete circlip installation tool, including both lower 510 and upper 520 portions. In FIG. 5B, the circlip 501 is fitted over the lower portion of the tool 510 and the tool 510 is placed into the clutch pack 500 as shown. The operator activates the air cylinder on the press, and the cylinder is forced down, pushing down the upper portion 520 of the installation tool. This upper portion 520 of the installation tool compresses the spring in the clutch 500 and forces the circlip 501 over the taper of the lower part 510 of the installation tool and to its final position, as depicted in FIG. 5C. When the circlip reaches its final position, it snaps closed into a groove in the clutch drum. The cylinder is released and the installation tool is removed and put aside, leaving the fully assembled clutch pack, depicted in FIG. 5D. The clutch pack is then ready to be checked for the correct clearance of the clutch pack and piston travel.

Figure 7:
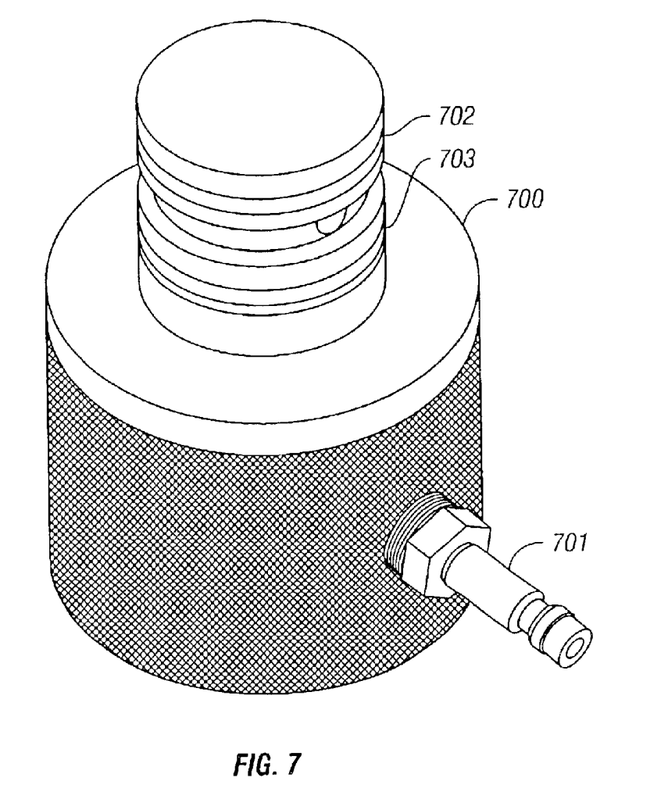
FIG. 7 depicts the upper portion of a press fixture in accordance with the present invention.

FIG. 7 depicts the upper portion of the clearance-checking fixture in accordance with the present invention. With the clutch pack on the press fixture, the upper portion 700 of the checking fixture is inserted into the clutch pack. This may not be necessary depending on the type of clutch drum. For clutch designs that require the air pressure to be applied from below, a quick air connect 221 is incorporated into the base fixture as depicted in FIG. 3. In the present example, air pressure has to be applied from above. Therefore, the upper portion of the checking fixture is used. It replicates the function of the shaft in the transmission and supplies air between the two seals 702 and 703 in the clutch drum. Ports in the clutch drum direct the air to the under side of the clutch piston. With this tool inserted, a quick connect air feed 701 can be connected.

Figure 8:
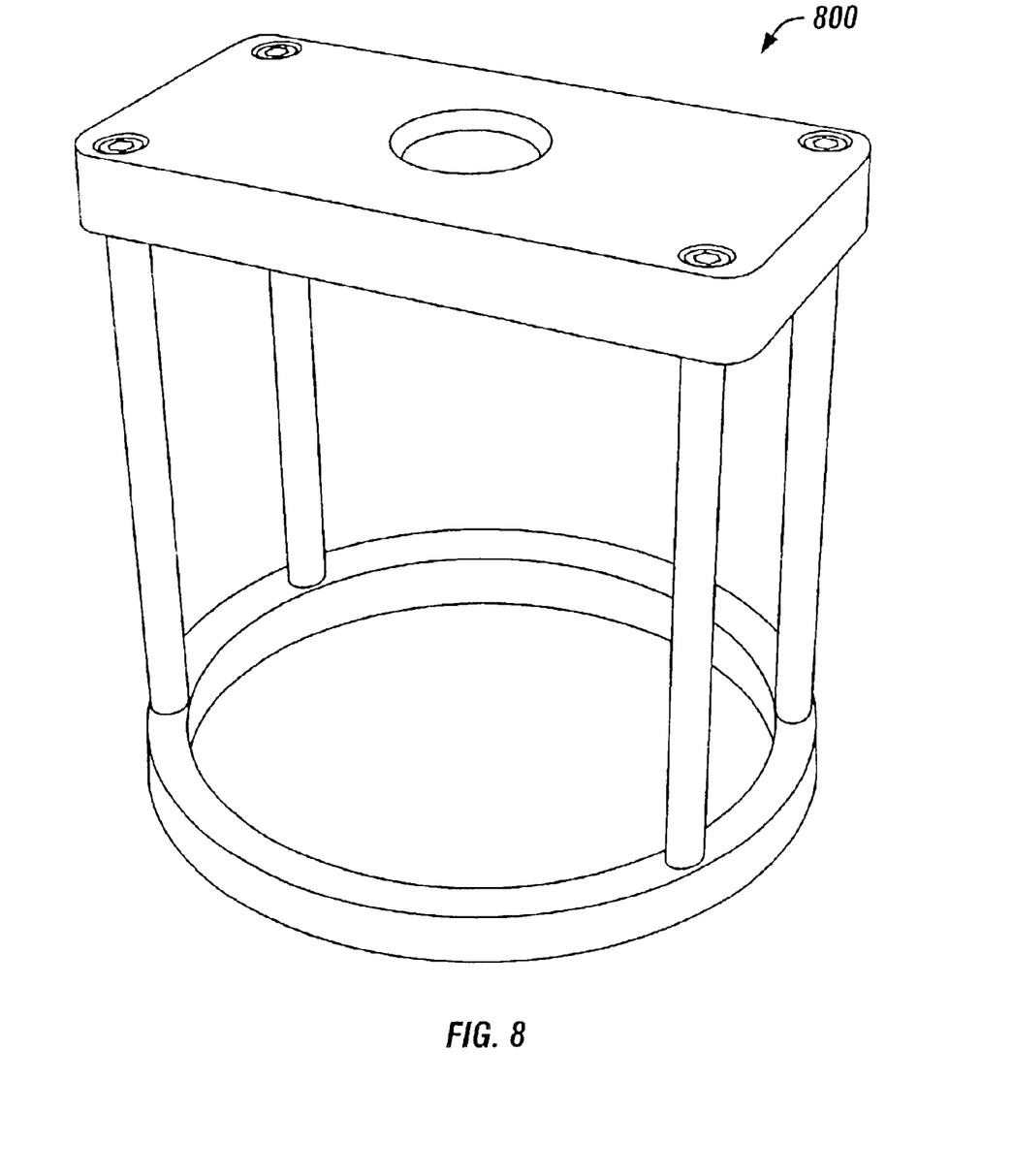
FIG. 8 depicts a plate compression tool in accordance with the present invention.

After the upper portion 700 of the press fixture is inserted into the clutch pack, a plate compression tool 800, depicted in FIG. 8, is placed onto the clutch pack.

Figure 9:
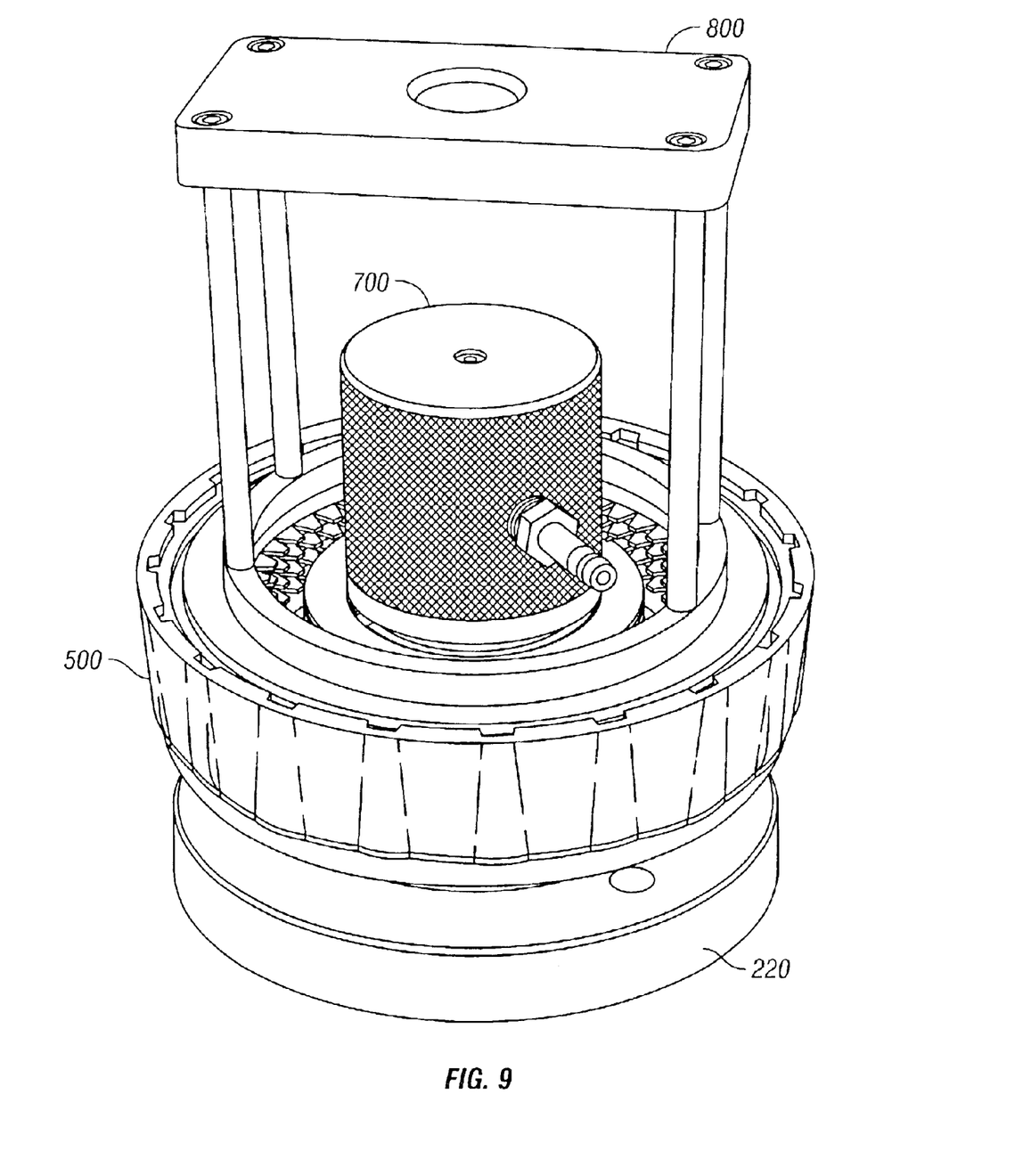
FIG. 9 depicts the fixture base, clutch, upper press fixture portion and plate compression tool assembled together for clutch clearance testing in accordance with the present invention.

FIG. 9 illustrates the combined assembly used for testing clutch clearance, comprising the fixture base 220, clutch drum 500, upper portion 700 of the press fixture, and the plate compression tool 800. With all of the elements in place on the press, the operator brings down the ram cylinder onto the plate compression tool. Once the ram is fully down, the operator switches the press control from "Air Cylinder" to "Weight". This switch vents air from the cylinder so it is in a free state, and the weight at the top of the ram is the only thing now pushing down on the clutch pack. The clutch pack is now compressed and in the lower portion of the drum. The linear gauge is then set to zero at the clutch's off state.

The operator uses the correct spring-loaded switch to apply pressure to the clutch. Several switches might be available, with the proper switch identified in the work instructions for the clutch pack in question. Air pressure is applied to the underside of the clutch piston, forcing it to move upwards, moving the clutch pack towards the reaction plate at the top of the clutch. This will be the total travel of the clutch under normal operating conditions.

The operator reads the movement of the linear gauge from a display unit. This is the distance the clutch pack was allowed to move during the piston's full travel and is therefore the clutch clearance. If the correct pressure is read on the gauge and there is no sound of leakage in the clutch pack, this indicates that the clutch piston seals are fitted correctly and there is no damage.

The movement of the linear gauge can then be checked against specifications. In this case there are three factors: air pressure, the pre-loaded weight, and the clutch clearance specification. Air pressure and weight are fixed components of the machine's design. If the movement of the linear gauge is incorrect (according to specifications), the reaction plate on top of the clutch pack can be changed to a different thickness. If the travel is too great, a thick plate would be used and vice-versa. The reaction plates come in a range of thicknesses to enable this fine-tuning.

After the movement of the linear gauge is recorded, the air cylinder ram is retracted and the plate compression tool is removed. The circlip is removed and the reaction plate is taken out of the clutch and measured with a caliper. For example, the reaction plate in the clutch pack might be 6 mm. The clearance specification might be 0.55–0.57 mm, with the target clearance being 0.65 mm. If the measured clearance turns out to be 1.65 mm, the original 6 mm reaction plate would then be replaced with a 7 mm reaction plate, in order to eliminate the unnecessary 1 mm of clearance. Once the correct reaction plate is selected, it is placed into the clutch and the circlip is reinstalled, and the clearance check procedure is repeated to ensure that the clutch is indeed within the target clearance specifications.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

I claim:

1. A method for testing an automobile transmission clutch, the method comprising the steps of:
   (a) assembling the clutch on a fixture, wherein the clutch includes a reaction plate that determines the travel distance of a piston inside the clutch;
   (b) compressing the clutch with a pneumatic press;
   (c) maintaining the clutch compression with a weight, wherein pneumatic pressure is removed from the press;
   (d) applying air pressure to the piston within the clutch;
   (e) determining displacement of the weight resulting from the air pressure applied to the piston, wherein the displacement of the weight represents clutch clearance; and
   (f) if the clutch clearance does not fall within predetermined specifications, replacing the reaction plate with a new reaction plate of different thickness and repeating steps (b) through (e).

2. The method according to claim 1, wherein step (a) further comprises: compressing a spring inside the clutch with a press; and installing a retaining ring to hold the spring under tension.

3. The method according to claim 2, wherein the retaining ring is installed with a special installation tool that has a tapered portion, wherein the retaining ring is placed over the narrow end of the tapered portion and the wide end of the tapered portion is placed in the clutch, and wherein a press forces the retaining ring over the wide end of the tapered portion causing the retaining ring to snap into a secured position in the clutch.

4. The method according to claim 1, wherein the fixture has multiple bases for holding a plurality of clutches, wherein the fixture can switch which one of the plurality of clutches is in position under the press.

5. An apparatus for testing an automobile transmission clutch, the apparatus comprising:
   (a) a fixture for assembling the clutch, wherein the clutch includes a reaction plate that determines the travel distance of a piston inside the clutch;
   (b) a pneumatic press for compressing the clutch;
   (c) a weight for maintaining the clutch compression after pneumatic pressure is removed from the press;
   (d) an air compressor and lead for applying air pressure to the piston within the clutch;
   (e) a linear gauge for determining displacement of the weight resulting from the air pressure applied to the piston, wherein the displacement of the weight represents clutch clearance, and
   (f) if the clutch clearance does not fall within predetermined specifications, a means for replacing the reaction plate with a new reaction plate of different thickness.

6. The apparatus according to claim 5, further comprising:
   a tool for compressing a spring inside the clutch and installing a retaining ring to hold the spring under tension.

7. The apparatus according to claim 6, wherein the installation tool further comprises:
   a tapered portion, wherein the retaining ring is placed over the narrow end of the tapered portion and the wide end of the tapered portion is placed in the clutch, and wherein a press forces the retaining ring over the wide end of the tapered portion causing the retaining ring to snap into a secured position in the clutch.

8. The apparatus according to claim 5, wherein the fixture has multiple bases for holding a plurality of clutches, wherein the fixture can switch which one of the plurality of clutches is in position under the press.

* * * * *